US009865102B2

(12) United States Patent
Daily et al.

(10) Patent No.: US 9,865,102 B2
(45) Date of Patent: Jan. 9, 2018

(54) WHEELED VEHICLE EVENT DATA RECORDER FORENSIC RECOVERY AND PRESERVATION SYSTEM

(71) Applicant: The University of Tulsa, Tulsa, OK (US)

(72) Inventors: Jeremy Daily, Broken Arrow, OK (US); James Johnson, Tulsa, OK (US); Andrew Kongs, Tulsa, OK (US); Jose Corcega, Broken Arrow, OK (US)

(73) Assignee: The University of Tulsa, Tulsa, OK (US)

( * ) Notice: Subject to any disclaimer, the term of this patent is extended or adjusted under 35 U.S.C. 154(b) by 0 days.

(21) Appl. No.: 14/783,729

(22) PCT Filed: Apr. 10, 2014

(86) PCT No.: PCT/US2014/033634
§ 371 (c)(1),
(2) Date: Oct. 9, 2015

(87) PCT Pub. No.: WO2014/169112
PCT Pub. Date: Oct. 16, 2014

(65) Prior Publication Data
US 2016/0247335 A1 Aug. 25, 2016

Related U.S. Application Data

(60) Provisional application No. 61/811,004, filed on Apr. 11, 2013.

(51) Int. Cl.
*G07C 5/08* (2006.01)
*G06F 17/00* (2006.01)
*G06F 19/00* (2011.01)

(52) U.S. Cl.
CPC .................................. *G07C 5/0841* (2013.01)

(58) Field of Classification Search
CPC ............ G07C 5/08; G06F 17/00; G06F 19/00
See application file for complete search history.

(56) References Cited

U.S. PATENT DOCUMENTS

| | | | |
|---|---|---|---|
| 2002/0145666 | A1 | 10/2002 | Scaman et al. |
| 2010/0250053 | A1 | 9/2010 | Grill et al. |

(Continued)

FOREIGN PATENT DOCUMENTS

| | | | |
|---|---|---|---|
| EP | 1034984 | A2 | 9/2000 |
| WO | 01/97524 | A1 | 12/2001 |
| WO | 02/37399 | A1 | 5/2002 |

*Primary Examiner* — Yonel Beaulieu
*Assistant Examiner* — Martin Weeks
(74) *Attorney, Agent, or Firm* — GableGotwals

(57) ABSTRACT

A system and method to preserve the integrity of data being extracted from an electronic data recorder ("EDR") of an electronic control module ("ECM") makes use of a forensic link adapter and, optionally, a sensor simulator (when ECM is out of the vehicle). The forensic link adapter has one or more first microprocessors and a first software means which prevent any message being sent by an external network from corrupting the previously recorded data measurements. The data measurements are then extracted, verified, and stored in a separate file. The sensor simulator has one or more second microprocessors, a second software means, and a bank of resistors that mimic sensors normally in communication with the ECM. The simulator "tricks" the ECM into thinking it is still in the vehicle by using the replicating vehicle system values the ECM normally sees when in the vehicle.

17 Claims, 9 Drawing Sheets

(56) References Cited

U.S. PATENT DOCUMENTS

| | | | | |
|---|---|---|---|---|
| 2012/0222130 | A1 | 8/2012 | Lee et al. | |
| 2014/0157407 | A1* | 6/2014 | Krishnan | G06F 21/53<br>726/22 |

* cited by examiner

WHEELED VEHICLE EVENT DATA RECORDER FORENSIC RECOVERY AND PRESERVATION SYSTEM

CROSS-REFERENCE TO RELATED APPLICATIONS

This application is the U.S. National Phase of Patent Application No. PCT/US2014/033634 filed 10 Apr. 2014, which claims priority to U.S. Provisional No. 61/811,004 filed 11 Apr. 2013, each of which is incorporated herein by reference.

BACKGROUND OF THE INVENTION

This invention relates generally to systems, apparatuses and methods for retrieving data from an event data recorder ("EDR") of a motor vehicle. More specifically, the invention relates to systems, apparatuses and methods for extracting the data and storing the extracted data in a forensically sound manner.

Modern vehicles often have event data recording capabilities built into different electronic control modules ("ECMs") of the vehicle. Whether integrated into an existing ECM, or working as a standalone device, EDRs may contain information of importance to help answer legal questions. In these cases, the data must be extracted and preserved in a forensically sound manner. As of yet, data captured from these devices may not be preserved in a forensically sound way. Furthermore, a cumbersome process is needed to gather EDR information, especially from heavy trucks (see e.g., William Messerschmidt et al., *Minimizing the Risk of Losing Valuable Forensic Data When Downloading the Electronic Control Modules* (*ECMs*) *of Heavy Commercial Vehicles* (2011), available from Messerschmidt Safety Consultants; Timothy Austin and William Messerschmidt, *Electronic Control Module Field Guide* (January 2010 ed.), available from Harris Technical Services; Plant et al. *Data Extraction Methods and their Effects on the Retention of Event Data Contained in the Electronic Control Modules of Detroit Diesel and Mercedes-Benz Engines*, SAE Paper 2011-01-0808). The data extraction process uses original equipment manufacturer software designed for maintenance, not forensic use. The most common way to access the EDR and its data is through the vehicle network using a vehicle diagnostic adapter ("VDA") interfacing a PC with the vehicle.

There are three main methods for downloading event data from ECMs when they cannot be accessed through the vehicle network: reprogramming harness, surrogate vehicle download, and a passive interface system (see e.g. Boggess et al., *A New Passive Interface to Simulate On-Vehicle Systems for Direct-to-Module* (*DTM*) *Engine Control Module* (*ECM*) *Data Recovery*, SAE Paper 2010-01-1994).

Use of a reprogramming harness involves disconnecting the vehicle harness and then connecting the reprogramming harness, which is powered by an external power source, directly to the ECM. The problem with this method is that it almost always creates new fault codes which are completely unrelated to the crash or event of interest. Depending on the ECM, these new fault codes can overwrite previous fault codes that may have had useful data.

A surrogate vehicle download requires that the ECM be removed from the subject vehicle; placed into an undamaged, substantially similar vehicle; and then downloaded using the in-cab diagnostic connector. This method is reliable but finding a suitable surrogate vehicle can be difficult and expensive. Further, this method is feasible only for large fleets of similar vehicles, but the opportunity cost of not having the surrogate vehicle in service can be considerable.

The passive interface system is a specialized custom-configured device built using either actual truck components, simulated truck components or both. The interface system simulates the normal connections between a vehicle and an ECM and does not create new fault codes when the ECM is being downloaded. This method is limited to the truck configuration which the box is designed to simulate and is expensive because of the cost of the truck components used to build the box.

Data from the ECM that is interpreted and stored by the original equipment manufacturer's software are usually stored on a general purpose host computer running a Windows operating system. These data file formats are not encrypted or hashed with a verifiable hash. As such, the data can be manipulated after it is obtained from the ECM without being detected. Furthermore, the ECM may be put back into service, which means the original digital record is no longer available. This means there is no rigorous method available to verify the authenticity and integrity of the ECM data, other than having agreements in place before the download occurs.

Original Equipment Manufacturer software contains provisions to reset data within an ECM, like the date and time stamps. Because the time record of an ECM is useful in correlating data to an event, resetting these data is detrimental to being able to verify the time of the recorded data. As such, some sort of command filtering mechanism is needed. International Publication No. WO 2013/144962 A1 (PCT/IL2013/050290) *Security System and Method for Protecting a Vehicle Electronic System* provides some overarching concepts regarding the idea of message filtering from a cyber-security perspective. That application and its references are hereby incorporated by reference.

Therefore, a need exists for a general purpose wheeled vehicle EDR forensic recovery and preservation system that is less expensive and more reliable (and, as a result, defensible in a court of law) than existing recovery methods.

SUMMARY OF THE INVENTION

A wheeled vehicle event data recorder ("EDR") forensic recovery and preservation system made according to this invention includes hardware and software components. The hardware components include a "smart sensor simulator" that produces signals equivalent to a fault free truck and a "forensic link adapter" that initiates communication with an ECM, protects or firewalls communication with the ECM, provides cryptographic hashing of the data, uses external references to keep accurate time, and interfaces with the user.

The "smart sensor simulator" makes the ECM containing the forensic data think that it is still in an actual vehicle or in communication with a vehicle similar to the one that was in the crash. Unlike the passive interface devices described in the background of the invention, a simulator made according to this invention is a general purpose one and not specific to a truck or engine. The simulator includes a bank of resistors that simulate resistor-based sensors and one or more microprocessors and supporting electronics that can simulate active signals. The one or more microprocessors can adjust certain voltage and network values to produce a fault free system when interacting with an ECM. One or more serial interfaces are included to communicate with the ECM.

In the forensic link adapter one or more microprocessors filter communication traffic from external communication (e.g. from the diagnostic software) to prevent accidental system resets, data clearing, or other message traffic that generally disrupt the forensic data extraction. Variations of this write-blocking apparatus can also be implemented as security devices in vehicle communication systems that block network traffic from being transmitted from one side of a network to another.

The one or more microprocessors respond to values sent to it through a vehicle diagnostic adapter ("VDA") used by the software component or other diagnostic software. In a preferred embodiment, the VDA hardware is RP1210 compliant and integrated into the forensic link adapter. The time is set in the forensic link adapter by referencing an external signal, like a GPS, radio, or cellular signal. External geospatial referencing is also performed automatically in the forensic link adapter so the user does not have to enter time or geospatial data into the system.

There are two or more software components: one that runs on one or more of the embedded microprocessors of the "smart sensor simulator" and another that runs on an embedded device managing the communications with the ECM (the "forensic link adapter"). The forensic link adapter refers to any multi-use computing platform like an embedded computer, laptop computer, tablet computer, mobile device (e.g. Android or iPhone), and the like. The software component that runs on the host forensic link adapter replaces or supplements the ECM's diagnostic software and provides secure extraction, storage, and verification of digital forensic data. The software component on the forensic link adapter does not purposefully delete diagnostic information by default and does not require a user to engage in ad-hoc processes to retrieve and record critical information. The software component communicates with the simulator using standard communication protocols, records all relevant diagnostic information, and provides cryptographic functionality to ensure the integrity of evidence in storage.

A software component of the forensic link adapter may include a network traffic replay mechanisms that enables a historical record of vehicle network traffic to be replayed to a VDA. This enables the forensic link adapter to emulate the behavior of an electronic control module and represent the data on that module according to the history of the network traffic.

The forensic link adapter may have an external interface in which it can acquire a time reference and automatically set its internal real-time clock. Likewise, the system may include an external interface to acquire geospatial information and automatically record its location. A preferred embodiment would use a GPS satellite based system for both time and geospatial systems. Other embodiments may use cell tower triangulation or FM time stamp signals.

The software component on the embedded devices of the forensic link adapter will filter messages and requests sent from the host PC to the ECM. The messages will be compared against a list of messages not allowed to be sent to the ECM, which is known as a blacklist. Typical messages that are blacklisted are messages that request fault data to be cleared or for clock data to be reset or changed. The embedded software component may have message storage capabilities and other multipurpose information services.

The vehicle diagnostic adapter ("VDA") is the link between the PC software and the embedded software. A VDA is prior art and complies with the American Trucking Association's Truck Maintenance Council's Recommended Practice Number 1210, which describes the application programming interface (API) for an interface device to communicate with a Windows computer. The RP1210 compliant VDA can be included in the forensic link adapter. The RP1210 device enables the user to use RP1210 compliant software along with the forensic link adapter. The VDA can also be used just with the smart sensor simulator.

Objects of this invention include providing an EDR forensic recovery and preservation system and method that:

1. does not overwrite ECM data or introduce new fault codes into that data; eliminates the need for a surrogate or donor vehicle or a specialized passive interface simulator;
2. preserves the original ECM record in such a way that the data are defensible against invalidity attacks during legal proceedings;
3. is less expensive but more reliable than the surrogate vehicle or specialized passive interface simulators;
4. is general purpose and, therefore, can be used for a variety of vehicles and be manufactured in volume;
5. can simulate a broad range of vehicle components and systems, including communication networks and dynamic signals;
6. can be used as a simulated vehicle or truck for testing of vehicle components or for simulating operation of the vehicle;
7. contains a serial communications message filter to block message traffic that can alter the digital record on an ECM;
8. can replay the network message traffic that was present during the initial interaction of the ECM;
9. can update an embedded real-time clock using one or more an external references; and
10. can acquire system geospatial information from one or more external references.

DETAILED DESCRIPTION OF THE PREFERRED EMBODIMENTS

Figure 1:
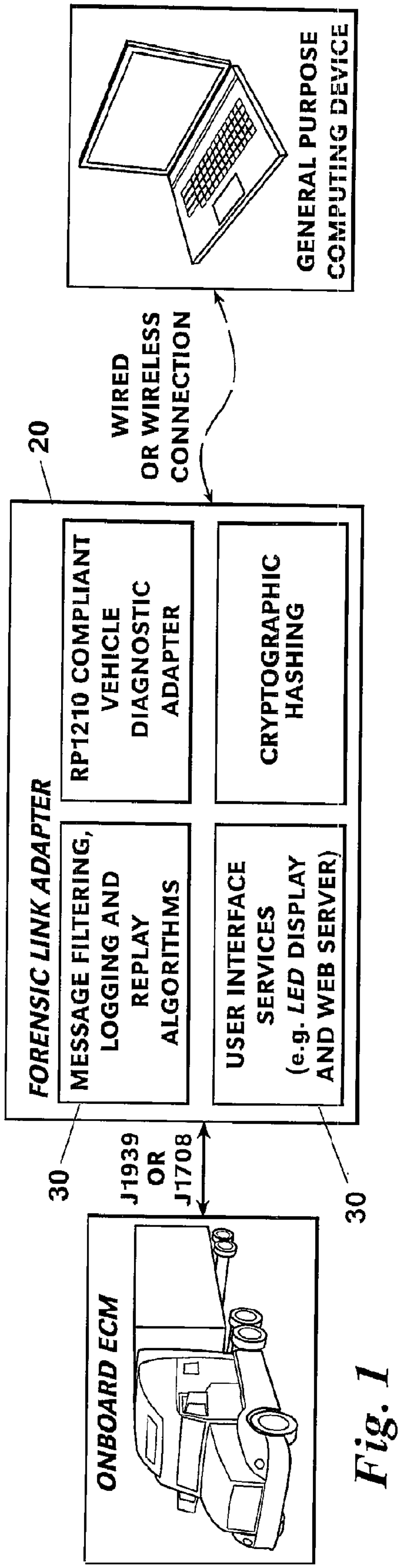
FIG. 1 is a schematic of a preferred embodiment of a wheeled vehicle event data recorder forensic recovery and preservation system made according to this invention where the vehicle communications network is intact. The ECM can be accessed directly from the vehicle network. The system includes a hardware component ("forensic link adapter") in communication with an ECM and a software component (forensic preservation software) running on the embedded microprocessors in the forensic link adapter. The user interfaces with the forensic link adapter through either a wired or wireless interface. A display may exist on the forensic link adapter or the user interacts with the hardware through a computer program like a web browser.
Figure 2:
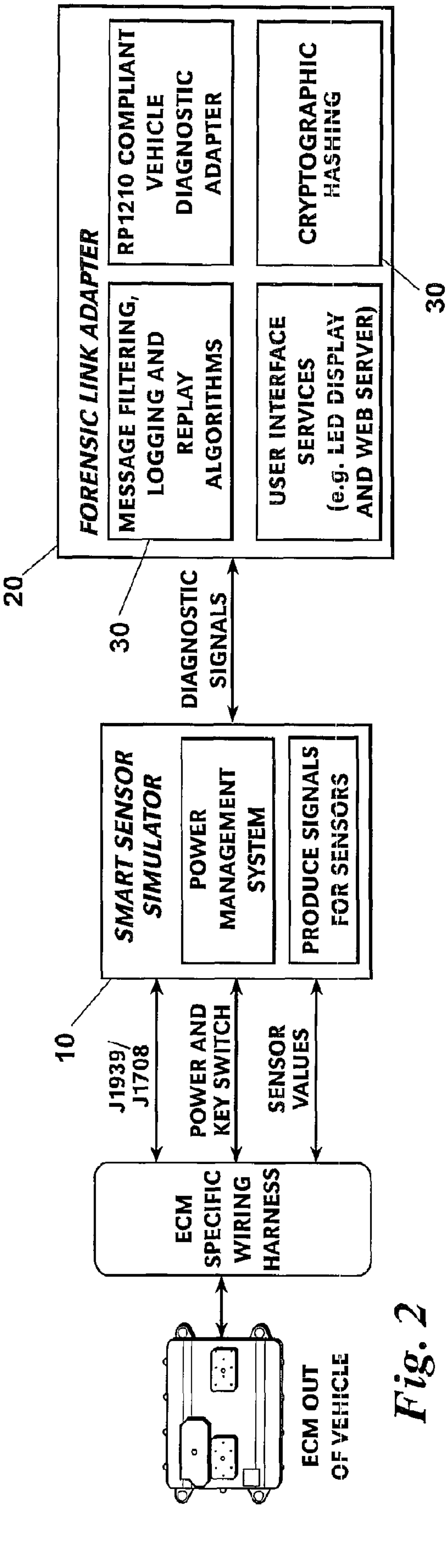
FIG. 2 is a schematic of a preferred embodiment of a wheeled vehicle event data recorder forensic recovery and preservation system made according to this invention where the vehicle communications network is not intact. The ECM is out of the vehicle and signals are generated for the ECM by the "smart sensor simulator". The smart sensor simulator handles communication, power management, and sets appropriate sensor values. In a preferred embodiment, the forensic link adapter would connect to the smart sensor simulator and commence the data extraction. The smart sensor simulator could also work with an existing vehicle diagnostic adapter ("VDA") device as the smart sensor simulator is presenting the ECM to the user as if it were in a vehicle.

Referring first to FIGS. 1 and 2, a wheeled vehicle event data recorder forensic recovery and preservation system made according to this invention includes hardware components adapter 20 and simulator 10 and a software component ("forensic preservation software 30" or "software 30"). If a vehicle network is unavailable, the simulator 10 provides an emulated environment for the ECM so it thinks it is in the vehicle and connected to the proper sensors. Simulator 10 provides a physical connection between the ECM and forensic link adapter 20. This enables the adapter 20 to run software 30 to extract and preserve the forensic data from an ECM. The ECM is one that contains forensic data from a vehicle under study.

A vehicle diagnostic adapter ("VDA") provides an interface from existing diagnostic software to forensic link adapter 20. If existing diagnostics software is used (e.g. DDEC Reports), then software 30 will examine and filter the messages coming from the VDA to adapter 20 and block any message that can disrupt the forensic process (e.g. a command to reset the time) (see FIG. 6). Alternatively, the VDA may be separated from the adapter 20 and used only on simulator 10; however, the benefit of message filtering will not be present if adapter 20 is not used.

Figure 8:
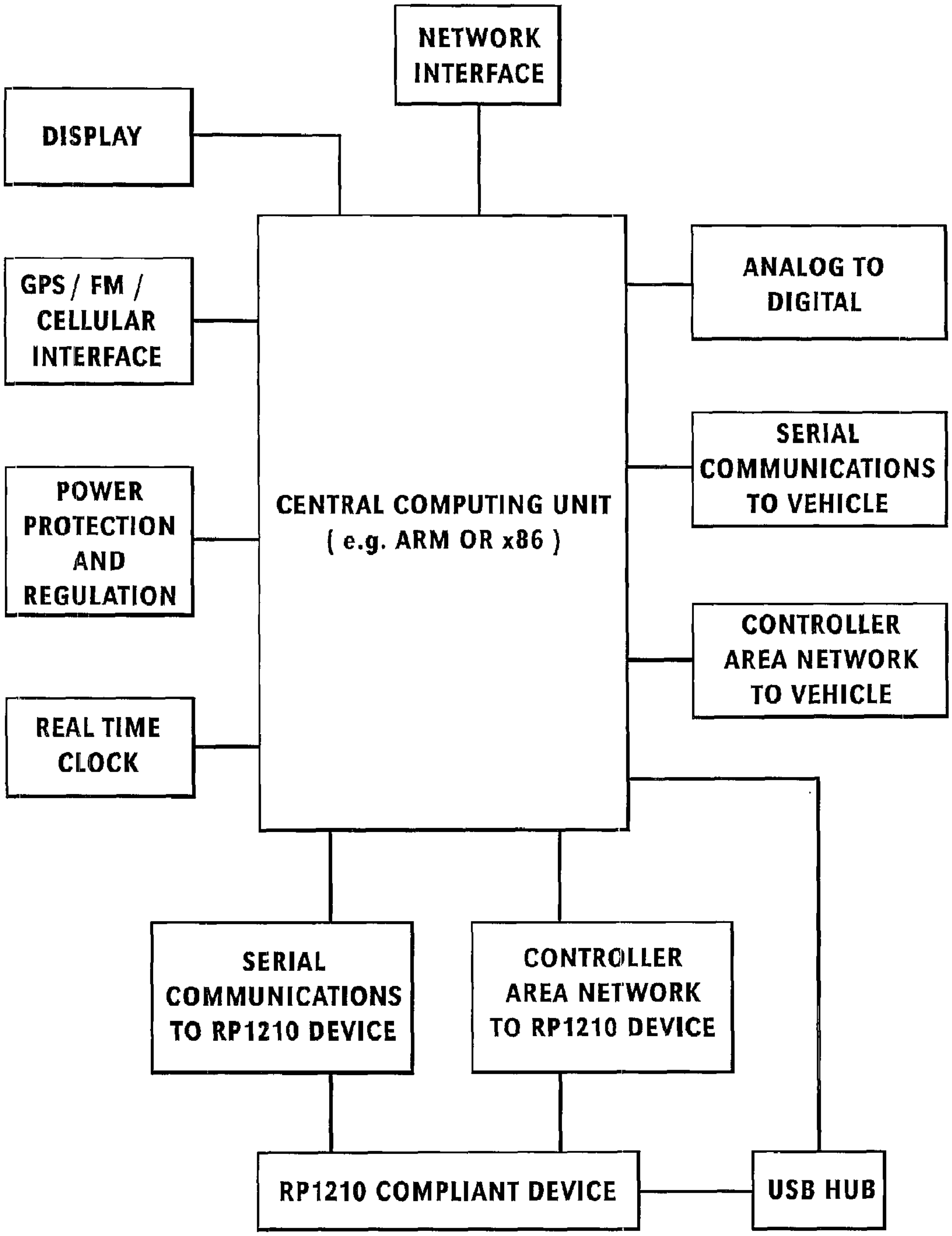
FIG. 8 is a schematic for a preferred embodiment of the forensic link adapter of FIGS. 1 and 2. A prototype of the adapter uses a DG Technologies, Inc. (Farmington Hills, Mich.) eDPA as the RP1210 compliant VDA and an ARM-based microprocessor built into a commercially available single board computer (e.g. a BEAGLEBONE™ board (CircuitCo., Richardson, Tex.) as the processing unit. The interface electronics and supplementary peripherals (like a real time clock) are shown in the schematic.

A preferred embodiment of the forensic link adapter 20 of FIGS. 1 and 2 is shown in FIG. 8. This particular embodiment uses a DG Technologies eDPA as the RP1210 compliant VDA and an ARM-based microprocessor built into a commercially available single board computer (e.g. a BEAGLEBONE™ board (CircuitCo., Richardson, Tex.)) as the processing unit. The interface electronics and supplementary peripherals (like a real time clock) are shown in the schematic.

Appendices 1-3 provide examples of the types of signals and communication between the ECM, simulator 10, adapter 20 running the forensic preservation software 30. An alternative embodiment would implement the forensic preservation software on a general purpose computer and use a commercial off-the-shelf VDA to interface with the vehicle or the smart sensor simulator. The requirement to filter, store, hash, and replay the message data would remain the same.

The simulator 10 is configured in such a way so that when it is in communication with the ECM, the ECM senses that it is still in a vehicle similar to the one from which it was removed. This is important because an ECM that is not in a vehicle will query missing sensors and produce new fault codes. Because some forensic data is stored as fault freeze frame data, a new fault code alters the digital record in the ECM. Furthermore, on some ECMs, a new freeze frame may overwrite the data of interest and make it irrecoverable.

Figure 5:
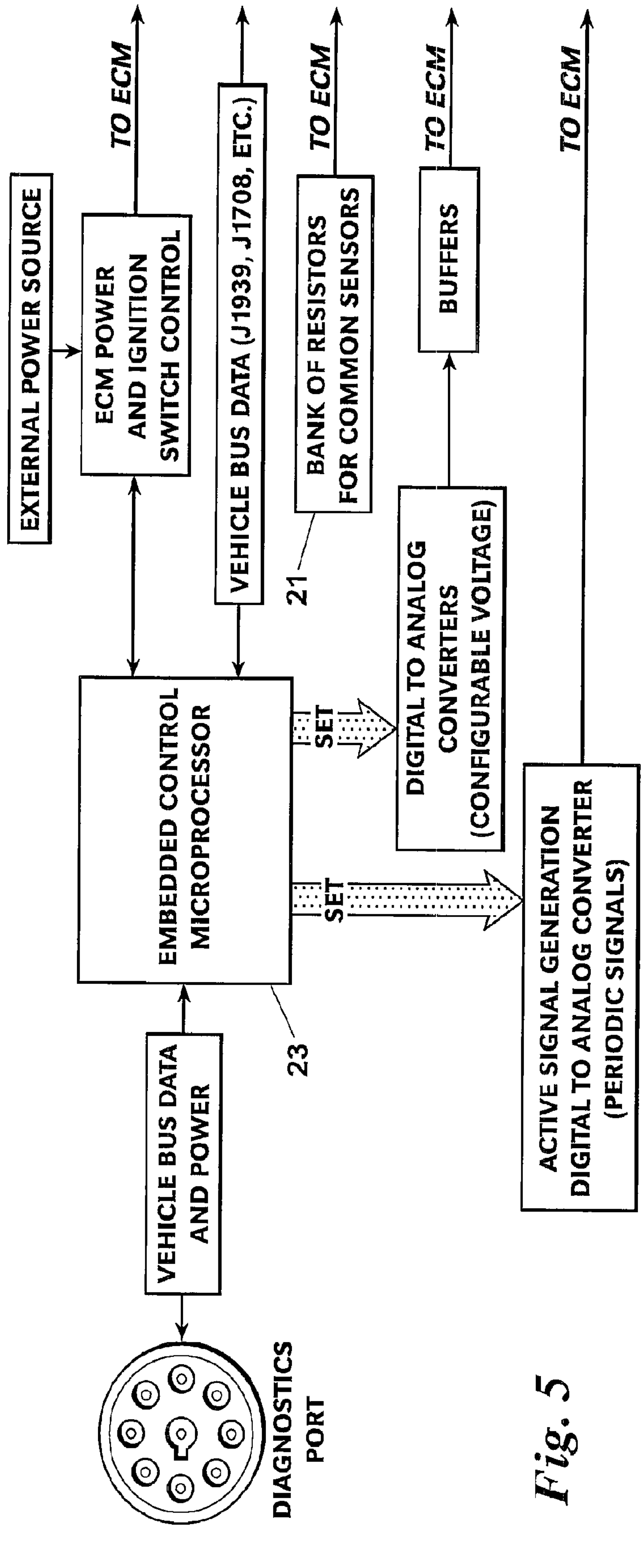
FIG. 5 is an overview of the configuration process and components used for a forensic image with the ECM outside the vehicle. It shows the systems described as the smart sensor simulator and the forensic link adapter as shown in FIG. 2.

Referring to FIG. 5, the simulator 10 has as at least one bank of resistors 21 that simulate resistor-based sensors (e.g., like those used in a vehicle temperature system; see also Appendix 2). The number and location of resistors 21 can be adjusted according to the needs of the ECM. Additionally, the simulator includes a microprocessor 23 that can adjust certain voltage and network values to produce a fault free system on the part of the ECM (i.e., not overwriting existing data or introducing new fault codes). The microprocessor 23 can respond to values sent to it through adapter 20 or a VDA used by the forensic preservation software 30.

Figure 4:
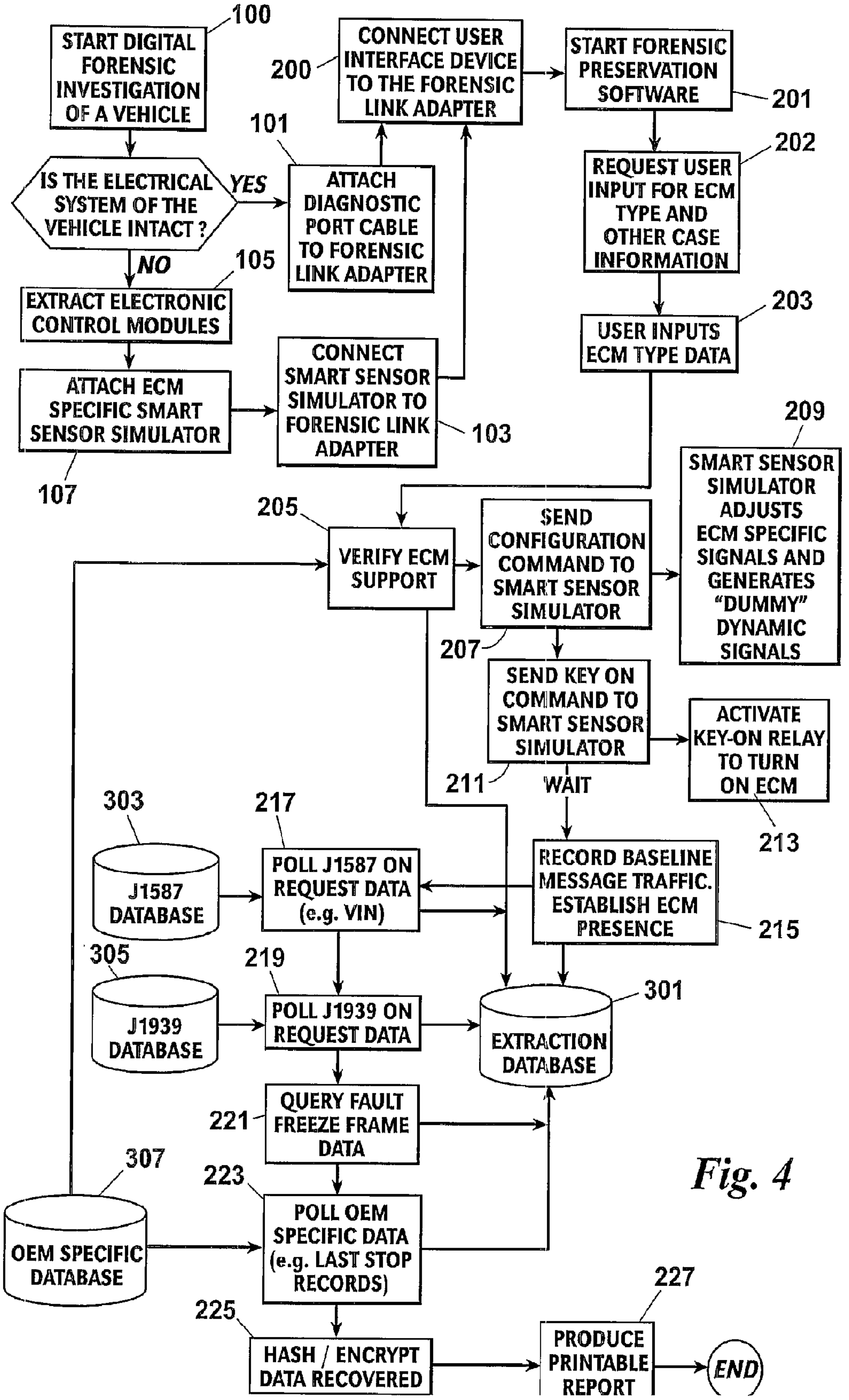
FIG. 4 is a detailed flow chart of the preferred process to use the systems shown in FIGS. 1 and 2, illustrating the relationship between the ECM, smart sensor simulator, forensic link adapter, and forensic preservation software.

The forensic preservation software 30 replaces or augments the vehicle's engine diagnostic software and provides secure extraction, storage, and verification of digital data (see FIG. 4). The data obtained from the ECM is stored in an extraction database 301. The data is interpreted using information and conventions standardized by the Society of Automotive Engineers (SAE) 303, 305, but some data 307 are proprietary to the engine or vehicle manufacturer.

Engine diagnostic software is designed with maintenance, rather than forensic, applications in mind. Therefore, the diagnostic software may delete diagnostic information by default. Second, the diagnostic software does not provide functionality to easily record all necessary information. This necessitates the use of ad-hoc processes to record the information, such as taking screenshots of information displays.

Figure 3:
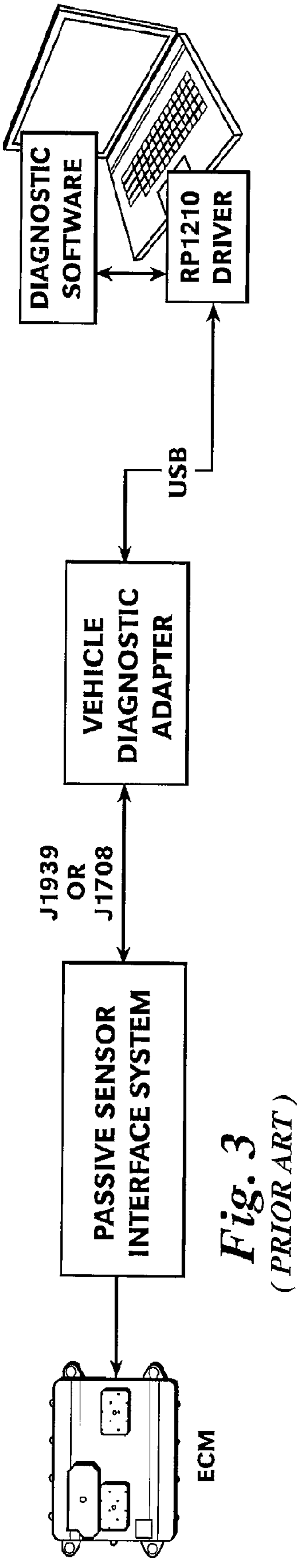
Fig. 3 ( PRIOR ART )
FIG. 3 is a schematic of prior art engine diagnostic software in communication with an ECM through a VDA and a passive sensor interface system. This process was described in the background section of this invention.

Referring to FIG. 3, engine diagnostic software makes use of an RP1210 interface connected via a USB connector to a data or vehicle diagnostic adapter ("VDA") in communication with the ECM. ECM data are sent over a vehicle communications network to the diagnostic connector using a communication protocol like SAE J1939 or J1708. The VDA then passes the data through the RP1210 software interface to the diagnostic software. Because of the two-way communication between the diagnostic software and the ECM, ECM data can get overwritten, the time can be reset, historical trip data cleared or some other method that deletes or alters data is possible as the diagnostic software responds to the ECM data and sends commands back to the ECM.

Referring to FIG. 2, the forensic preservation software 30 is in direct communication with the ECM through simulator 10. The simulator 10 is in communication with the ECM, thereby "tricking" the ECM into sensing that it is still in the vehicle from which it was removed. As the ECM data are passed to the software 30, the software 30 writes the data to a file and does not send commands back to the ECM that could disrupt the forensic process (see FIG. 6). Therefore, the forensic preservation software 30 records all relevant diagnostic information as well as provides cryptographic functionality to ensure the integrity of evidence in storage (see FIG. 4 at element 301; see also FIG. 6). An alternative embodiment could implement the message blocking at the driver level in the RP1210 compliant host.

The simulator 10 has at least one bank of resistors 21 (see FIG. 5) that simulate resistor-based sensors, each resistor in the bank corresponding to one of the sensors (e.g., like those used in a vehicle temperature system) and is in communication with the electronic control module ("ECM") of a wheeled vehicle and a forensic preservation system (the "forensic link adapter") made according to this invention.

Software 30 makes use of memory mapping and forensic replay to emulate the previously recorded data to the engine diagnostic software. This enables the user to interpret the data using his or her own software while still maintaining the forensic soundness of the original verifiable network message traffic. The diagnostic software reads data from the engine by requesting blocks of data using a memory address and a requested number of bytes. Replying to these messages from the replay mechanism (see FIG. 7) is a matter of finding the correct address in the source image and responding with the appropriate number of bytes. While the memory space may be quite large, the data itself are quite sparse. Blocks of data are interspersed with large regions that contain no data at all. Therefore, storing a copy of the memory space is inefficient.

In software 30, sparse data are represented by creating "bins," with each bin indexed by the first byte of the memory address. When the diagnostic software requests data from the replay mechanism, the replay software or indexes into the appropriate bin using the first byte.

The replay mechanism (see FIG. 7) is transparent to the user because it is accessed through an RP1210 interface library, the same interface that the diagnostic software uses to communicate with the VDA. The adapter 20 running the software 30 can respond to the requests from the VDA and emulate the ECM based on the data it previously recorded. However, instead of communicating with the physical ECM, the replay mechanism accesses a forensic image file.

When the diagnostic software issues a request for a memory block, the replay mechanism responds to the request by mapping the request data to the correct portion of the image file (using the process described above), reading it, and then formatting a response as though it were a network response from a truck ECM. In this way, the diagnostic program is cannot distinguish between the data from the ECM and the data from the forensic image being replayed.

Referring to FIG. 4, the wheeled vehicle event data recorder forensic recovery and preservation system 10 includes two main processes, 100 and 200. Process 100 starts the forensic investigation of a vehicle and involves connecting the ECM to the simulator 10 and the simulator 10 to adapter 20 running the forensic preservation software 30. Process 201 starts the forensic preservation software 30 and involves polling, extracting and storing the ECM data in such a way as to not introduce fault codes. An alternative embodiment may have the forensic software 30 running on a general purpose computer (as opposed to or in addition to adapter 30).

If the electrical system of the vehicle is still intact, the ECM is connected to adapter 20 via a diagnostic port in the vehicle cab (see FIG. 1). If the electrical system of the vehicle is not intact, the ECM is removed from the vehicle and connected to the simulator 10 using an ECM-specific cable. Once the ECM is connected to the simulator 10, the simulator 10 is connected to adapter 20 (see FIG. 2) running the forensic preservation software 30.

Step 202 requests user input for case-specific information, including but not limited to the ECM type. In step 203, the user inputs the case-specific information and ECM type. Step 205 then verifies support of that ECM by querying the OEM specific database 307, copying that ECM-specific information to the extraction database 301 and, in step 207, sending a configuration command to simulator 10.

Step 209 adjusts ECM-specific signals using simulator 10 and the simulator 10 generates emulated dynamic signals. Those emulated dynamic signals enable the ECM to sense that it is still in communication with vehicle systems or, if the ECM has been removed, in a similar vehicle. Step 211 sends a "key-on" command to simulator 10 and step 213 activates the key switch circuit to simulate a drive turning on the ignition key. An alternative embodiment may omit this process and rely on the user to activate the key-on signal manually.

Once the key-on command has been sent to simulator 10, step 215 establishes ECM presence and records baseline message traffic to the extraction database 301. Steps 217 to 223 poll the databases 303, 305, 307, respectively, and record the recovered data in the extraction database 301. Step 225 uses a hashing algorithm to provide a verification record of the recovered data (see also e.g., FIG. 9). Step 227 produces a human readable report.

Referring to FIG. 5, configuring simulator 10 for use involves the following steps:

1. Using the user interface of the software 30, a user selects the type of ECM from which forensic data are to be extracted or the simulator 10 queries the ECM to determine identifying information;
2. The embedded control microprocessor 23 configures the digital to analog converters to a set of voltages to emulate the set of sensors (see e.g. bank of resistors 21) for a specific ECM;
3. The control microprocessor 23 powers on the ECM through a device such as a relay or large transistor; and
4. Upon powering the ECM, the embedded control computer begins broadcasting messages to the vehicle data bus to simulate regular traffic from normal components such as the vehicle brake controller.

Figure 6:
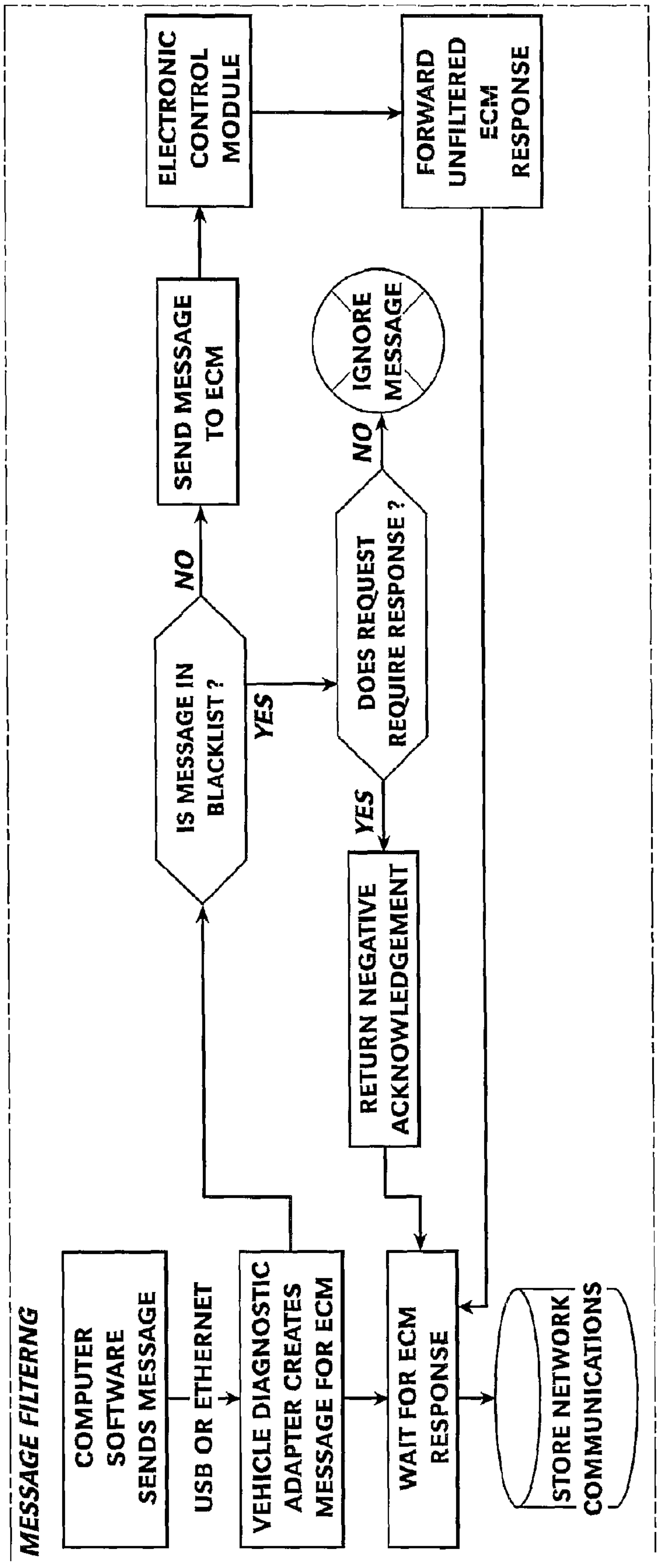
FIG. 6 is a block diagram showing the concept of message filtering to ensure messages that may alter the digital record on the ECM are blocked. Responses from the ECM are not blocked.

Referring to FIG. 6, the operation of the hardware and embedded software 30 of simulator 10 follows these principles of operation:

1. Once the system has been connected appropriately, the VDA will attempt to interrogate the vehicle network and controller for information.
2. Because the VDA has no consideration for the traffic it sends nor the consequences of it, the software 30 must first analyze the traffic the VDA is sending.
3. Using a store-and-forward technique, all traffic to the vehicle network from the VDA to the vehicle network is intercepted and stored on the embedded computer for a short amount of time. The software 30 analyzes the stored messages from the VDA and forwards the messages that are known to be safe to transmit to the vehicle network based on information stored in the database. The database contains known messages that will not corrupt the integrity of any data, based on careful analysis of actual traffic.

4. Any replies from the vehicle network to the VDA are intercepted. This is simply a consequence of most vehicle network layouts. Replies will be passed back to the VDA without analysis and recorded.
5. Records of all transactions will be kept and combined with geospatial and time data. A human readable record may be produced. These data elements comprise the forensic image file, which is subsequently hashed and encrypted according to the details of FIG. 10.

Figure 7:
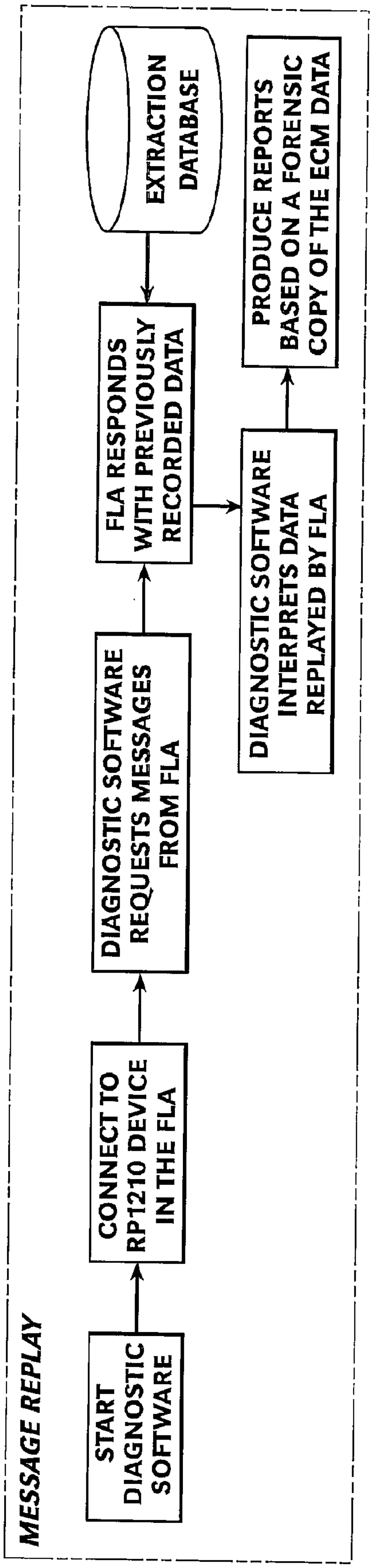
FIG. 7 is a block diagram showing the replay of forensically stored data to any diagnostic software. The replay engine is used to interpret a forensic copy of the digital data from the ECM. In a preferred embodiment, the replay mechanism is part of the software on the embedded devices of the forensic link adapter. However, the replay mechanism can be implemented in the driver stack of the RP120 windows drivers.

FIG. 7 shows the replay of forensically stored data (see element 301 FIG. 4) to any diagnostic software. The replay engine or mechanism is used to interpret a forensic copy of the digital data from the ECM. In a preferred embodiment, the replay mechanism is part of the software on the embedded devices of the forensic link adapter 20 ("FLA" in FIG. 7). The diagnostic software requests messages from the adapter 20 and the adapter 20 responds with previously recorded data from extraction database 301. The diagnostic software interprets the data being replayed and produces a report based of the ECM data. The replay mechanism can be implemented in the driver stack of the RP120 windows drivers.

Figure 9:
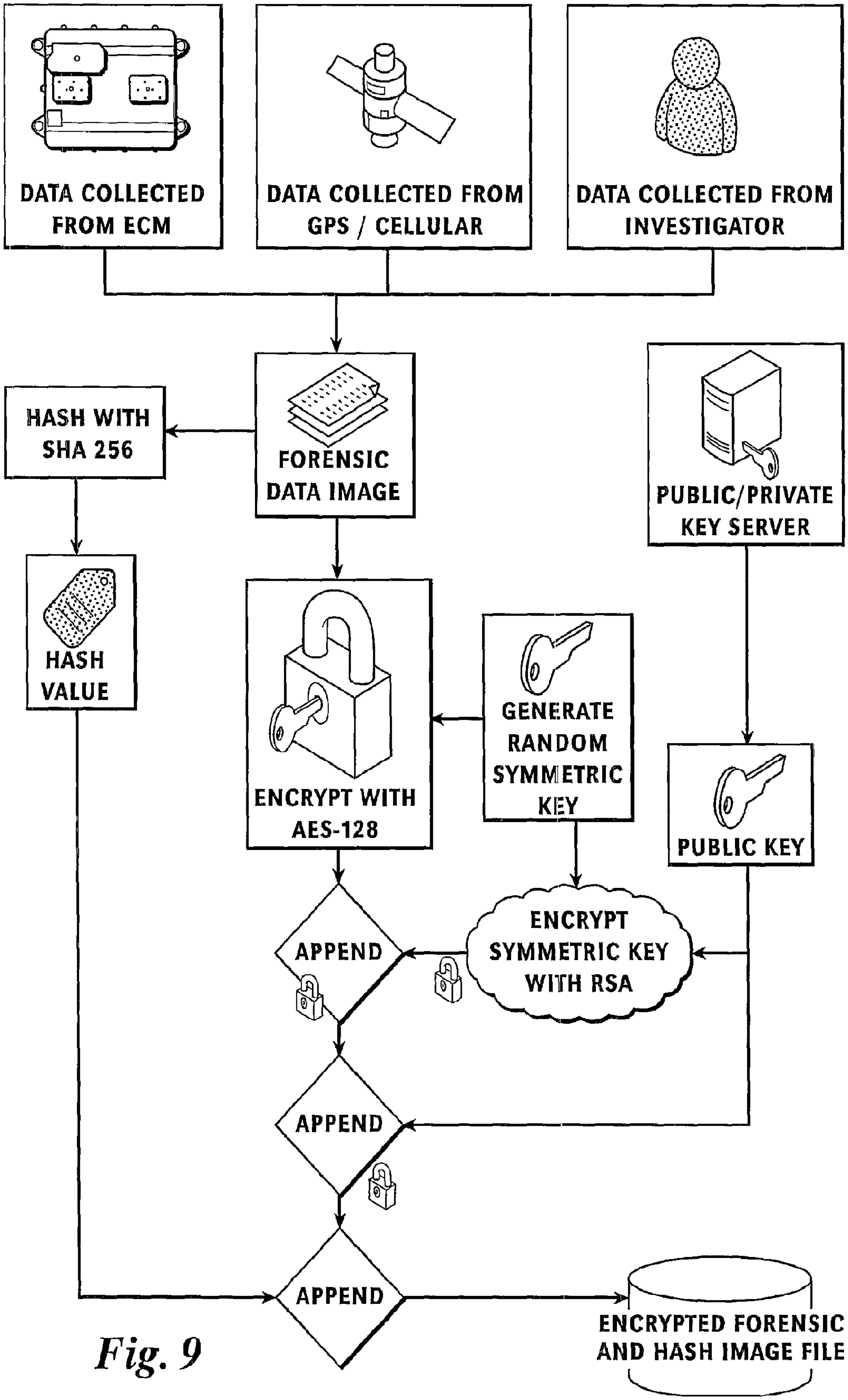
FIG. 9 shows a preferred method of using both symmetric and asymmetric encryption to secure a forensic image. The cryptographic hash value used for verification is appended to the file for use later if needed for verification. The algorithms highlighted in the figure can be replaced with functions that are also forensically sound.

A hashing algorithm provides a verification record of the recovered data (see step 225 of FIG. 4 and FIG. 9). The preferred method uses both symmetric and asymmetric encryption to secure a forensic image. The cryptographic hash value used for verification is appended to a encrypted forensic and hash image file for use later if needed for verification. The algorithms highlighted in FIG. 9 can be replaced with equivalent algorithms or functions that are also forensically sound.

Appendix 1 is a table mapping the ECM connector pinouts and signal names for a CATERPILLAR® C15 MSX engine controller (ADEM III). This represents a typical ECM.

Appendix 2 is a table listing the change in resistance values corresponding to fault codes of the ECM of Appendix 2. This represents the results of the methods used to obtain specific values for the components in the smart sensor simulator device 10.

Appendix 3 is a table showing a partial mapping of ECM pin outs for various diesel engine manufacturers to the simulator of FIG. 1, thereby permitting a generic smart sensor simulator 10 to be used.

While preferred embodiments of the system and method have been described, the invention itself is defined by the following claims, including elements equivalent to those specifically listed in the claims.

APPENDIX 1

Caterpillar® ADEM III ECM Signals

| Connector P1 | | Connector P2 | |
|---|---|---|---|
| P1-1 | | P2-1 | |
| P1-2 | +5 V | P2-2 | PRESSURE SENSOR SUPPLY +5 V |
| P1-3 | INPUT SENSOR COMMON #2 | P2-3 | PRESSURE SENSOR RETURN |
| P1-4 | +8 V Accel pedal | P2-4 | |
| P1-5 | AP SENSOR/SWITCH COMMON | P2-5 | |
| P1-6 | INPUT #6 | P2-6 | |
| P1-7 | INPUT #4 | P2-7 | |
| P1-8 | J1587 DATA LINK POSITIVE | P2-8 | COOLANT DIVERTER SOLENOID VALVE |
| P1-9 | J1587 DATA LINK NEGATIVE | P2-9 | RETARDER COMMON |
| P1-10 | OUTPUT #2 | P2-10 | RETARDER SOLENOID MED/HI |
| P1-11 | OUTPUT #5 | P2-11 | RETARDER SOLENOID LOW/HI |
| P1-12 | OUTPUT #3 | P2-12 | |
| P1-13 | OUTPUT #4 | P2-13 | |
| P1-14 | | P2-14 | ATMOSPHERIC PRESSURE |
| P1-15 | INPUT #14 | P2-15 | |
| P1-16 | | P2-16 | |
| P1-17 | | P2-17 | |
| P1-18 | INPUT SENSOR COMMON #1 | P2-18 | TEMPERATURE SENSOR COMMON |
| P1-19 | OUTPUT #6 | P2-19 | |
| P1-20 | OUTPUT #7 | P2-20 | INTAKE VALVE ACTUATOR 1 RETURN |
| P1-21 | OUTPUT #8 | P2-21 | INTAKE VALVE ACTUATOR 2 RETURN |
| P1-22 | CLUTCH PEDAL POSITION SWITCH | P2-22 | TIMING CALIBRATION PROBE(+) |
| P1-23 | RETARDER SOLENOID LOW/HI SWITCH | P2-23 | TIMING CALIBRATION PROBE(−) |
| P1-24 | INPUT #15 POSITIVE | P2-24 | ENGINE OIL PRESSURE SENSOR |
| P1-25 | INPUT #15 NEGATIVE | P2-25 | INTAKE VALVE ACTUATION OIL PRESSURE |
| P1-26 | INPUT #19 | P2-26 | |
| P1-27 | INPUT #10 | P2-27 | |
| P1-28 | CHECK ENGINE LAMP | P2-28 | INTAKE VALVE ACTUATOR 5 RETURN |
| P1-29 | WARNING LAMP | P2-29 | INTAKE VALVE ACTUATOR 6 RETURN |
| P1-30 | OUTPUT #1 | P2-30 | |
| P1-31 | OUTPUT #9 | P2-31 | INTAKE VALVE ACTUATOR OIL VALVE |
| P1-32 | VEHICLE SPEED IN POSITIVE | P2-32 | ENGINE COOLANT TEMPERATURE |
| P1-33 | VEHICLE SPEED IN NEGATIVE | P2-33 | FUEL TEMPERATURE |
| P1-34 | J1939 DATA LINK NEGATIVE | P2-34 | |
| P1-35 | CRUISE SET | P2-35 | INTAKE MANIFOLD AIR TEMPERATURE |
| P1-36 | SPEEDOMETER POSITIVE | P2-36 | INJECTOR 1&2 |
| P1-37 | SPEEDOMETER NEGATIVE | P2-37 | INJECTOR 3&4 |
| P1-38 | TACHOMETER POSITIVE | P2-38 | INJECTOR 5&6 |
| P1-39 | TACHOMETER NEGATIVE | P2-39 | INTAKE VALVE ACTUATOR 1&2 |
| P1-40 | RETARDER SOLENOID MED/HI SWITCH | P2-40 | BOOST PRESSURE SENSOR |
| P1-41 | INPUT #11 | P2-41 | IVA OIL PRESSURE SENSOR +5 V |
| P1-42 | J1939 DATA LINK SHIELD | P2-42 | IVA OIL SENSOR COMMON |
| P1-43 | | P2-43 | |

APPENDIX 1-continued

| Caterpillar ® ADEM III ECM Signals | | | |
|---|---|---|---|
| Connector P1 | | Connector P2 | |
| P1-44 | CRUISE RESUME | P2-44 | INJECTOR 1 RETURN |
| P1-45 | SERVICE BRAKE PEDAL POSITION SWITCH | P2-45 | INJECTOR 2 RETURN |
| P1-46 | INPUT #7 | P2-46 | INJECTOR 3 RETURN |
| P1-47 | INPUT #5 | P2-47 | INJECTOR 4 RETURN |
| P1-48 | UNSWITCHED +BATTERY | P2-48 | PRIMARY ENGINE SPEED/TIMING+ |
| P1-49 | ENGINE COOLANT LEVEL NORMAL | P2-49 | PRIMARY ENGINE SPEED/TIMING− |
| P1-50 | J1939 DATA LINK POSITIVE | P2-50 | |
| P1-51 | | P2-51 | |
| P1-52 | UNSWITCHED +BATTERY | P2-52 | |
| P1-53 | UNSWITCHED +BATTERY | P2-53 | CDV & IVA OIL VALVE RETURN |
| P1-54 | ENGINE COOLANT LEVEL LOW | P2-54 | INTAKE VALVE ACTUATOR 3&4 |
| P1-55 | | P2-55 | INTAKE VALVE ACTUATOR 5&6 |
| P1-56 | INPUT #1 | P2-56 | |
| P1-57 | | P2-57 | |
| P1-58 | INPUT #2 | P2-58 | SECONDARY ENGINE SPEED/TIMING+ |
| P1-59 | CRUISE CONTROL ON/OFF SWITCH | P2-59 | SECONDARY ENGINE SPEED/TIMING− |
| P1-60 | INPUT #3 | P2-60 | |
| P1-61 | | P2-61 | |
| P1-62 | INPUT #12 | P2-62 | |
| P1-63 | −BATTERY | P2-63 | |
| P1-64 | INPUT #13 | P2-64 | |
| P1-65 | −BATTERY | P2-65 | INTAKE VALVE ACTUATOR 3 RETURN |
| P1-66 | ACCELERATOR PEDAL POSITION | P2-66 | INTAKE VALVE ACTUATOR 4 RETURN |
| P1-67 | −BATTERY | P2-67 | INJECTOR 6 RETURN |
| P1-68 | INPUT #8 | P2-68 | INJECTOR 5 RETURN |
| P1-69 | | P2-69 | |
| P1-70 | IGNITION KEY SWITCH | P2-70 | |

Appendix 2

| N# | PINs Supply | Signal | Ground | Fault Code | Description |
|---|---|---|---|---|---|
| 1 | — | P1-54 | P1-67 | 111-2 | Engine coolant signal invalid |
| 2 | — | P1-19 | P1-67 | 54-5 | Output #6 circuit voltage high |
| 3 | — | P1-20 | P1-67 | 54-6 | Output #7 circuit voltage high |
| 4 | — | P2-31 | P2-53 | 283-5 | Intake valve actuator oil valve circuit voltage low |
| 5 | — | P2-8 | P2-53 | 284-5 | Coolant diverter solenoid circuit voltage low |
| 6 | P2-41 | P2-25 | P2-42 | 385-4 | Intake actuation oil pressure sensor circuit voltage high |
| 7 | P2-2 | P2-40 | P2-3 | 102-3 | Boots pressure sensor circuit voltage high |
| 8 | P2-2 | P2-24 | P2-3 | 100-3 | Engine oil pressure sensor circuit voltage high |
| 9 | P2-2 | P2-14 | P2-3 | 108-3 | Atmospheric pressure sensor circuit voltage high |
| 10 | — | P2-35 | P2-18 | 105-3/105-4 | Intake manifold air temperature voltage high/low |
| 11 | — | P2-33 | P2-18 | 174-3 | Fuel temperature sensor circuit voltage high |
| 12 | P1-4 | P1-66 | P1-5 | 91-8 | Throttle position signal invalid* |

| | Resistance Bound 1 [KW] | | Resistance Bound 2 [KW] | | Voltage Bound 1 (V) | | Voltage Bound 2 (V) | |
|---|---|---|---|---|---|---|---|---|
| N# | Supply signal | Ground signal | Supply signal | Ground signal | Supply signal | Ground signal | Supply signal | Ground signal |
| 1 | — | 0 | — | 3.85 | — | 0 | — | 1.9 |
| 2 | — | 0 | — | 62.8 | — | 0 | — | 1.5 |
| 3 | — | 0 | — | 62.8 | — | 0 | — | 1.5 |
| 4 | — | 0 | — | 63.4 | — | 0 | — | 1.5 |
| 5 | — | 0 | — | 62.7 | — | 0 | — | 1.5 |
| 6 | 0.985 | 0.0515 | 0 | 1 | 4.75 | 0.25 | 0 | 5 |
| 7 | 0 | 1 | 1 | 0 | 0 | 5 | 5 | 0 |
| 8 | 0 | 1 | 1 | 0 | 0 | 5 | 5 | 0 |
| 9 | 0 | 1 | 1 | 0 | 0 | 5 | 5 | 0 |
| 10 | — | 0.026 | — | 19.9 | — | 0.25 | — | 4.9 |
| 11 | — | 0 | — | 20.3 | — | 0 | — | 4.9 |
| 12 | — | — | — | — | — | — | — | — |

*Needs a signal frequency of 150 Hz < f < 1 kHz

Appendix 3

| Smart Sensor Simulator 10 ("SSS") | | ECM Pin Labels | | | | | | |
|---|---|---|---|---|---|---|---|---|
| SSS Pin | Pin Description | DDEC IV | | DDEC V | DDEC VI | DDEC X | CAT BXS | CAT MXS |
| 1 | J1939 (+) | L-3 | 925 | V-43 | CPC2-18 | CPC2-18 | P1-50 | P1-50 |
| 2 | J1939 (−) | M-3 | 926 | V-58 | CPC2-16 | CPC2-16 | P1-34 | P1-34 |
| 3 | J1939 Shield | N-3 | 927 | V-44 | CPC2-17 | CPC2-17 | P1-42 | P1-42 |
| 4 | J1587 (+) | C-2 | 900 | V-56 | CPC2-5 | — | P1-8 | P1-8 |
| 5 | J1587 (−) | C-1 | 901 | V-57 | CPC2-6 | — | P1-9 | P1-9 |
| 6 | Ignition | B-3 | 439 | V-15 | CPC2-3 | CPC2-3 | P1-70 | P1-70 |
| 7 | Main Battery + 12 V | A | 240 | V-61 | CPC2-1 | CPC2-1 | P1-48 | P1-48 |
| 8 | Main Battery Ground | B | 250 | V-63 | CPC2-2 | CPC2-2 | P1-63 | P1-63 |
| 9 | Vehicle Speed (+) | E-2 | 556 | V-17 | CPC3-13 | CPC3-13 | P1-32 | P1-32 |
| 10 | Vehicle Speed (−) | E-3 | 557 | V-18 | CPC3-14 | CPC3-14 | P1-33 | P1-33 |
| 11 | Low Coolant Level Sensor | H-3 | 115 | | CPC3-11 | CPC3-11 | P1-54 | P1-54 |
| 12 | OUTPUT #6 | | | | | | P1-19 | |
| 13 | OUTPUT #7 | | | | | | P1-20 | |
| 14 | OUTPUT #9 | | | | | | P1-31 | |
| 15 | Coolant diverter solenoid valve | | | | | | P2-8 | P2-5 |
| 16 | Intake actuation oil pressure | | | | | | P2-25 | P2-74 |
| 17 | Boost pressure | | | | | | P2-40 | P2-15 |
| 18 | Engine oil pressure sensor | P-2 | 530 | | | | P2-24 | P2-28 |
| 19 | Atmospheric pressure | | | | | | P2-14 | P2-57 |
| 20 | intake manifold air temperature | | | | 120-106 | MCM120-106 | P2-35 | P2-56 |
| 21 | Fuel temperature | | | | | MCM120-77 | P2-33 | |
| 22 | Throttle Position Sensor Supply | | | | CPC1-7 | CPC1-8 | P1-66 | P1-66 |
| 23 | Throttle Position Sensor | | | | CPC1-8 | CPC1-7 | P1-4 | P1-4 |
| 24 | Throttle Position Sensor Ground | | | | CPC1-4 | CPC1-4 | P2-3 | P2-17 |
| 25 | Coolant inlet temperature | | | | 120-110 | MCM120-80 | | P2-13 |
| 26 | Coolant outlet temperature | | | | | MCM120-110 | | |
| 27 | LIMITING SPEED GOVERNOR | D-2 | 417 | | | | | |
| 28 | SENSOR SUPPLY (5 VDC) | W-1 | 416 | | | | | |
| 29 | SENSOR RETURN (ENGINE) | Y-2 | 452 | | | | | |
| 30 | TURBO BOOST | P-1 | 432 | | | | | |
| 31 | ENGINE BRAKE MED | S-3 | 561 | | | | | |
| 32 | ENGINE BRAKE LO | T-3 | 562 | | | | | |
| 33 | Engine Oil Temperature Sensor | | | | 120-108 | MCM120-108 | | |
| 34 | Intake Manifold Pressure Sensor | | | | 120-87 | | | |
| 35 | Sensor Position Intake Air Throttle Valve | | | | 120-90 | MCM120-90 | | |
| 36 | DPF Outlet Temp Sensor | | | | 120-115 | | | |
| 37 | Turbo Compressor In Temp Sensor | | | | 120-86 | | | |
| 38 | DPF Outlet Pressure Sensor | | | | 120-30 | | | |
| 39 | DPF Inlet Pressure Sensor | | | | 120-118 | | | |
| 40 | EGR Valve | | | | 120-61 | | | |
| 41 | Jake Rear | | | | 120-66 | | | |
| 42 | Jake Front | | | | 120-32 | | | |
| 43 | SW and PWM power supply output | | | | | MCM120-64 | | |
| 44 | HC doser fuel pressure in | | | | | MCM120-84 | | |
| 45 | HC doser fuel pressure out | | | | | MCM120-111 | | |
| 46 | Differential pressure EGR | | | | | MCM120-109 | | |
| 47 | Charge air temperature | | | | | MCM120-119 | | |
| 48 | Charge air pressure | | | | | MCM120-87 | | |
| 49 | Rail pressure | | | | | MCM120-78 | | |
| 50 | DIFF heater | | | | | ACM-22 | | |
| 51 | SCR temp in sig | | | | | ACM-76 | | |
| 52 | SCR temp out sig | | | | | ACM-78 | | |
| 53 | DEF pump cont sig | | | | | ACM-20 | | |
| 54 | Dosing valve | | | | | ACM-28 | | |
| 55 | DEF tank cool | | | | | ACM-8 | | |
| 56 | DOC temp in ground | | | | | ACM-108 | | |
| 57 | DEF tank temp/valve ground | | | | | ACM-102 | | |
| 58 | DEF tank level sig | | | | | ACM-109 | | |
| 59 | DEF press sig | | | | | ACM-100 | | |
| 60 | Dosing unit air press signal | | | | | ACM-74 | | |
| 61 | Comp air signal | | | | | ACM-26 | | |

What is claimed:

1. A wheeled vehicle event data recorder forensic recovery and preservation system, the system comprising:

a forensic link adapter configured for communicating with an electronic control module of a motor vehicle, the forensic link adapter comprising a multi-use computing platform in communication with said electronic control module of said motor vehicle, said forensic link adapter including:

at least one first microprocessor; and a first software means in communication with the first microprocessor;

at least one of the first software means and the first microprocessor configured to:

prevent a new network message being sent on a vehicle network by vehicle diagnostic software to the electronic control module from corrupting the integrity of at least one data measurement previously recorded by an electronic data recorder of the electronic control module;

extract the previously recorded data measurement from the electronic data recorder; and verify integrity of the extracted previously recorded data measurement.

2. A system according to claim 1 further comprising means for storing the extracted previously recorded data measurement in a file independent of the electronic data recorder.

3. A system according to claim 1 wherein the first software means accomplishes the prevention by at least one of write-blocking, filtering, and omitting the message.

4. A system according to claim 1 further comprising cryptographic hashing means to verify integrity of the extracted previously recorded data measurement.

5. A system according to claim 1 further comprising a sensor simulator in communication with the electronic control module and the forensic link adapter, the sensor simulator including:

at least one second microprocessor;

one or more banks of resistors, each bank of resistors having at least one resistor configured to mimic at least one sensor normally in communication with the electronic control module; and a second software means in communication with the second microprocessor;

the second software means passing at least one sensor value from the electronic control module to the second microprocessor, the second microprocessor adjusting the sensor simulator to the sensor value.

6. A system according to claim 5 further comprising the sensor simulator including means for powering the electronic control module.

7. A system according to claim 1 further comprising means for updating at least one of a time data and a location data using an external reference when the system is in use.

8. A method of recovering and preserving forensic data from an electronic data recorder of an electronic control module, the method comprising the steps of:

(i) connecting a forensic link adapter comprising a multi-use computing platform to the electronic control module;

(ii) preventing a new network message being sent on a vehicle network by vehicle diagnostic software to the electronic control module from corrupting the integrity of at least one data measurement previously recorded by the electronic data recorder;

(iii) extracting the previously recorded data measurement from the electronic data recorder;

(iv) verifying the integrity of the extracted previously recorded data measurement; and (v) storing the verified extracted previously recorded data measurement in a file independent of the electronic data recorder.

9. A method according to claim 8 wherein the preventing step includes at least one of a blocking step, a filtering step, and an omitting step.

10. A method according to claim 8 wherein the verifying step includes a cryptographic hashing step.

11. A method according to claim 8 wherein said steps are executed using a forensic link adapter in communication with the electronic data recorder, the forensic link adapter including at least one first microprocessor and a first software means in communication with the first microprocessor.

12. A method according to claim 8 further comprising the step of simulating at least one sensor value.

13. A method of recovering and preserving forensic data from an electronic data recorder of an electronic control module, the method comprising the steps of:

(i) preventing a new network message being sent on a vehicle network by vehicle diagnostic software to the electronic control module from corrupting the integrity of at least one data measurement previously recorded by the electronic data recorder;

(ii) extracting the previously recorded data measurement from the electronic data recorder;

(iii) verifying the integrity of the extracted previously recorded data measurement; and (iv) storing the verified extracted previously recorded data measurement in a file independent of the electronic data recorder: further comprising a step of simulating at least one sensor value; and wherein the simulation step is executed using a sensor simulator in communication with the electronic control module and a forensic link adapter, the sensor simulator including:

at least one second microprocessor;

one or more banks of resistors, each bank of resistors having at least one resistor configured to mimic at least one sensor normally in communication with the electronic control module; and a second software means in communication with the second microprocessor;

the second software means passing at least one sensor value from the electronic control module to the second microprocessor, the second microprocessor adjusting the sensor simulator to the sensor value.

14. A method of recovering and preserving forensic data from an electronic data recorder of an electronic control module, the method comprising the steps of:

(i) preventing a new network message being sent on a vehicle network by vehicle diagnostic software to the electronic control module from corrupting the integrity of at least one data measurement previously recorded by the electronic data recorder;

(ii) extracting the previously recorded data measurement from the electronic data recorder;

(iii) verifying the integrity of the extracted previously recorded data measurement; and (iv) storing the verified extracted previously recorded data measurement in a file independent of the electronic data recorder; and further comprising a step of updating at least one of a time data and a location data using an external reference.

15. A method according to claim 8 further comprising the step of:

(v) replaying the stored verified extracted previously recorded data measurement.

16. A method of recovering and preserving forensic data from an electronic data recorder of an electronic control module, the method comprising the steps of:

(i) preventing a new network message being sent on a vehicle network bv vehicle diagnostic software to the electronic control module from corrupting the integrity of at least one data measurement previously recorded bv the electronic data recorder;

(ii) extracting the previously recorded data measurement from the electronic data recorder;

(iii) verifying the integrity of the extracted previously recorded data measurement; and (iv) storing the verified extracted previously recorded data measurement in a file independent of the electronic data recorder;

(v) replaying the stored verified extracted previously recorded data measurement; and further comprising the replaying step having the substeps of:

requesting a memory block of the file;

mapping the request to a correct portion of the file;

reading the correct portion of the file; and formatting the read correct portion of the file as though said portion was a vehicle network response.

17. A wheeled vehicle event data recorder forensic recovery and preservation system, the system comprising:

a forensic link adapter configured for use with an electronic control module of a motor vehicle, the forensic link adapter including:

at least one first microprocessor; and a first software means in communication with the first microprocessor;

at least one of the first software means and the first microprocessor configured to:

prevent a new message being sent on a vehicle network by vehicle diagnostic software to the electronic control module from corrupting the integrity of at least one data measurement previously recorded by an electronic data recorder of the electronic control module;

extract the previously recorded data measurement from the electronic data recorder; and verify integrity of the extracted previously recorded data measurement;

a sensor simulator including:

at least one second microprocessor;

one or more banks of resistors, each bank of resistors having at least one resistor configured to mimic at least one sensor normally in communication with the electronic control module; and a second software means in communication with the second microprocessor;

the second software means passing at least one sensor value from the electronic control module to the second microprocessor, the second microprocessor adjusting the sensor simulator to the sensor value.

* * * * *